United States Patent [19]

Rey et al.

[11] Patent Number: 5,096,017

[45] Date of Patent: Mar. 17, 1992

[54] AERO-ACOUSTIC LEVITATION DEVICE AND METHOD

[75] Inventors: Charles A. Rey, Riverwoods; Dennis R. Merkley, Arlington Heights, both of Ill.

[73] Assignee: Intersonics Incorporated, Northbrook, Ill.

[21] Appl. No.: 608,995

[22] Filed: Nov. 5, 1990

Related U.S. Application Data

[63] Continuation-in-part of Ser. No. 843,022, Mar. 24, 1986, Pat. No. 5,036,944.

[51] Int. Cl.$^5$ .............................................. G10K 11/00
[52] U.S. Cl. ........................................ 181/0.5; 73/505; 34/243 R
[58] Field of Search ................ 181/0.5; 367/191; 73/505; 156/DIG. 62; 34/4, 20, 42, 243 R

[56] References Cited

U.S. PATENT DOCUMENTS

| | | | |
|---|---|---|---|
| 4,052,181 | 10/1977 | Fletcher et al. | 73/505 X |
| 4,359,962 | 11/1982 | Olsson et al. | 181/0.5 X |
| 4,378,209 | 3/1983 | Berge et al. | 156/DIG. 62 |
| 4,393,708 | 7/1983 | Barmatz et al. | 73/505 |
| 4,420,977 | 12/1983 | Elleman et al. | 73/505 |
| 4,447,251 | 5/1984 | Dunn et al. | 181/0.5 X |
| 4,475,921 | 10/1984 | Barnatz | 181/0.5 X |
| 5,036,944 | 8/1991 | Danley et al. | 181/0.5 |

*Primary Examiner*—Brian S. Steinberger
*Attorney, Agent, or Firm*—Juettner Pyle & Lloyd

[57] ABSTRACT

An acoustic levitator device for suspending a specimen object under the influence of gravity without contact with a solid surface comprising in combination gas levitation means for directing a concentrated flow of gas along an axis upwardly against the object to provide a force to lift a majority weight of the object, and acoustic levitation means for exerting an acoustic positioning force on said object to restrain movement away from said axis and to hold said object in a given position.

15 Claims, 4 Drawing Sheets

AERO-ACOUSTIC LEVITATION DEVICE AND METHOD

CROSS REFERENCE

This is a continuation-in-part of application Ser. No. 843,022, filed Mar. 24, 1986 now U.S. Pat. No. 5,036,944.

BACKGROUND OF THE INVENTION

This invention relates to the levitation or positioning of an object by the use of remote forces such as acoustic, electromagnetic, or gas flow, which are imposed on the object in a non-contact fashion.

Various types of acoustic and other non-contact levitation techniques are well known. For example, acoustic levitation using tuned chambers are described in U.S. Pat. Nos. 3,882,732 and 4,054,181. Acoustic levitation in which a beam of sound is directed toward a small reflector is described in U.S. Pat. No. 4,284,403. Other known techniques include electromagnetic levitation and air jet or aerodynamic levitation, in which a stream of air is directed from beneath the object.

The above-identified application describes a method and apparatus for acoustic levitation in which an object is suspended between one or more pairs of opposed sound sources driven at the same frequency. The sound waves interfere to create a number of energy wells in which a specimen may be stably levitated or suspended. The phase of one sound source may be adjusted relative to the phase of the other source to move the position of the energy wells and cause the object to move.

A major proposed use of acoustic levitators is to process glass and ceramic materials in the microgravity of outer space. Electromagnetic levitation techniques are limited to the use of conductive specimens such as metals. With acoustic levitation, specimens of any type of material can be held in position while various experiments are being conducted. For example, a sample may be melted and cooled without any contact with a container, which eliminates any impurities being introduced by reason of contact of the sample with the container.

Acoustic levitation techniques on earth, however, are less effective because of the presence of gravity, especially if the levitated objects have a high density. The acoustical forces are relatively weak, and production of the necessary sound pressure levels is difficult. In addition, the production of high intensity sound results in distortions which are highly detrimental to levitation. The problems become intensified if the object is heated and cooled.

The use of a gas stream to levitate an object is advantageous because the lifting forces are considerably greater than those available with acoustic techniques. In the past, however, this technique has been limited to solid, spherical objects. The stream of gas causes the object to spin, which contributes to the lateral stability of a solid object, but typically prevents successful application to liquid objects. Generally, in the case of liquids or objects which are melted while being levitated the object flattens or otherwise changes shape and is ejected from the gas stream.

SUMMARY OF THE INVENTION

An object of this invention is to provide a levitator which is capable of stably levitating dense specimens in a one gravity environment.

Another object of this invention is to provide a levitator which is capable of levitating liquids using a stream of gas acting against the object.

A further object of this invention is to provide an aerodynamic levitator which is capable of accommodating a change of phase from solid to liquid.

The foregoing objectives are accomplished by the provision of a levitator in which a combination of aerodynamics and acoustic techniques are used. A stream of gas is directed from beneath the object to provide the primary vertical lifting force against the weight of the object in gravity. Acoustic forces are employed to hold the object in position with sufficient force to overcome vertical instabilities produced by the interaction between the object and the gas stream, to provide horizontal positioning, and to control the shape, spin, or other movement of the object.

The system may include position sensors to detect the position and condition of the object. The sensors may be employed in a feedback position, for example, to determine the velocity of the object and to damp unwanted movements by adjustments of relative phase and amplitude of the sound sources, or to adjust the rate of gas flow. The acoustic forces may also be employed to contain and shape a liquid which is levitated by gas flow and to control the spin of the object. In addition, the gas may be heated to improve efficiency and performance of the gas jet levitator.

It has been found that the use of gas levitation actually improves the stability of the associated acoustic levitator, particularly where the levitated object is heated. The air flow minimizes random or irregular temperature gradients around the object, and such gradients are known to be highly detrimental to stable acoustic levitation. In the past, this problem has placed a severe practical upper limit on the temperature gradients which could be tolerated by acoustic levitators.

THE DRAWINGS

DESCRIPTION OF THE PREFERRED EMBODIMENTS

Figure 1:
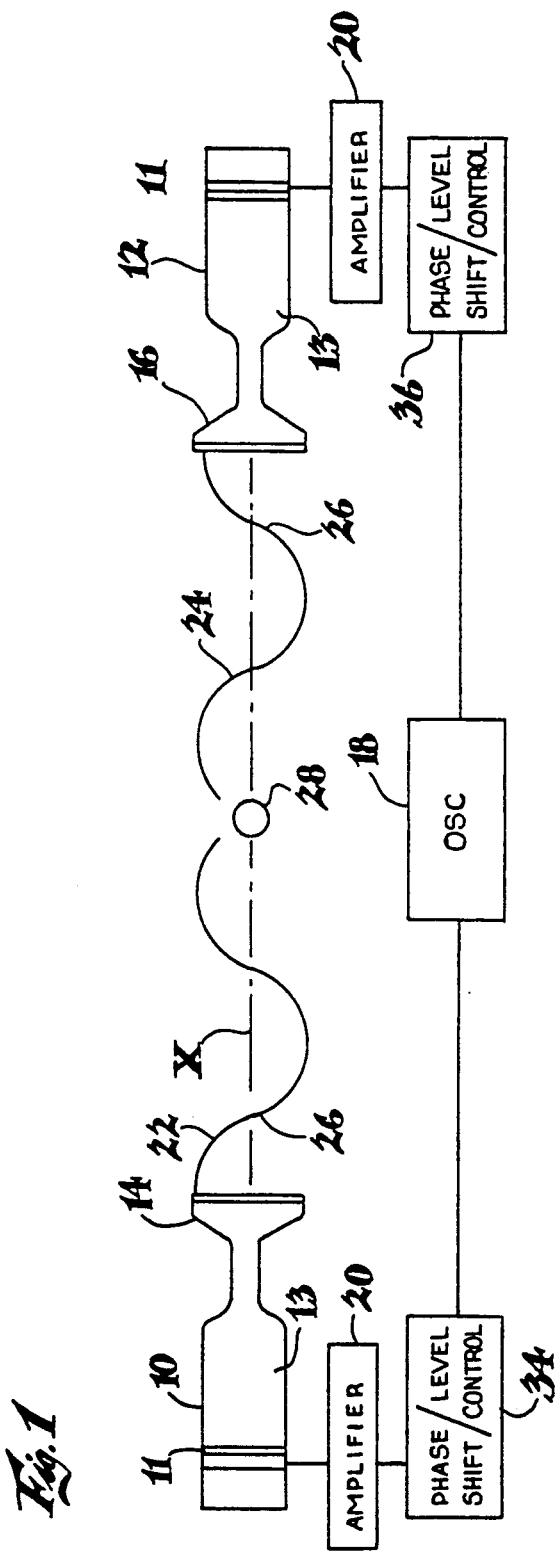
FIG. 1 is a schematic view of the acoustic levitator used in connection with the present invention.

FIG. 1 illustrates a pair of opposed sound sources 10 and 12 having respective sound radiating surfaces 14 and 16 which generate sound toward each other substantially along a common axis x. The sound sources may be conventional in nature but preferably are capable of producing sound of high intensity, i.e., above 120 dB. The sound sources or transducers 10 and 12 may be of the solid piston type containing electromechanical driving means, such as piezoelectric or magnetostrictive, or a conventional voice coil.

As shown in FIG. 1, the sound radiating surfaces 14 and 16 may be concave or dish shaped in order to concentrate or beam a useful column of intense sound in opposite directions along the axis x. The sound sources are connected to a common oscillator 18 and amplifiers 20 to produce sound at the same frequency. In the embodiment shown, each sound source includes a plurality of piezoelectric wafers 11 receiving a signal from the oscillator 18 and held in compression with a cylindrical rod or piston 13 secured to the concave radiators 14 and 16. The wafers expand and contract or vibrate at high levels of force to cause vibration of the rod 13 and radiator 14 or 16.

When the sound sources 10 and 12 are driven at the same frequency, an interference wave pattern is established therebetween. Preferably, the sound sources are also driven at the same intensity to produce a uniform interference pattern. For the sake of illustration, the pattern shown in FIG. 1 is shown to include a sound wave 22 from source 10 and a sound wave of the same wavelength 24 from source 12, which, at certain points along the axis x, interfere and reinforce each other and provide nodes 26 of low acoustic pressure. The nodes 26 appear at each half wavelength of the sound being used and define energy wells in which solid or liquid objects such as 28 may be stably levitated. The nodes or energy wells 26 provide resultant forces which hold or contain the object 28 both axially and radially. If the sound being employed is sufficiently intense, light to medium density objects may be levitated against the force of gravity.

With further reference to FIG. 1, phase shift and level controls 34 and 36 are connected to either one or both of the amplifiers in order to change the phase of one sound source relative to the other, for example, by a control 38. The control 38 may be adjusted to provide a positive, negative or zero change of phase of one sound source relative to another. A change of relative phase between the sound sources causes a corresponding change in the location of the energy wells 26 along the axis x. Thus, a change in phase will cause the levitated object 28 to move along the axis x in either axial direction, depending on whether a positive or negative phase change is made.

The degree of axial movement ($\Delta X$) or translation of the levitated object for a given change of phase in radians ($\Delta \Phi$) at a given wavelength ($\lambda$) is given by as:

$$\Delta X = \frac{\Delta \Phi}{2\pi} \cdot \frac{\lambda}{2}$$

The velocity of the levitated object during a continuous and constant rate of phase change per unit time is defined as:

$$\frac{\Delta X}{\Delta T} = \frac{\lambda}{4\pi} \cdot \frac{\Delta \Phi}{\Delta T}$$

It may be seen that a relative phase change between the two sound sources allows movement of the levitated object toward or away from either sound source at a constant or variable speed. For example, a rapid periodic reversal or modulation of phase would cause the object to be agitated or vibrated. The phase change can be programmed in advance, for example, to move an object to a given location, stop the object, and then move the object away from the location along the common axis. Thus, the levitated object could be moved into a hot zone for melting and then into a cool zone.

Figure 2:
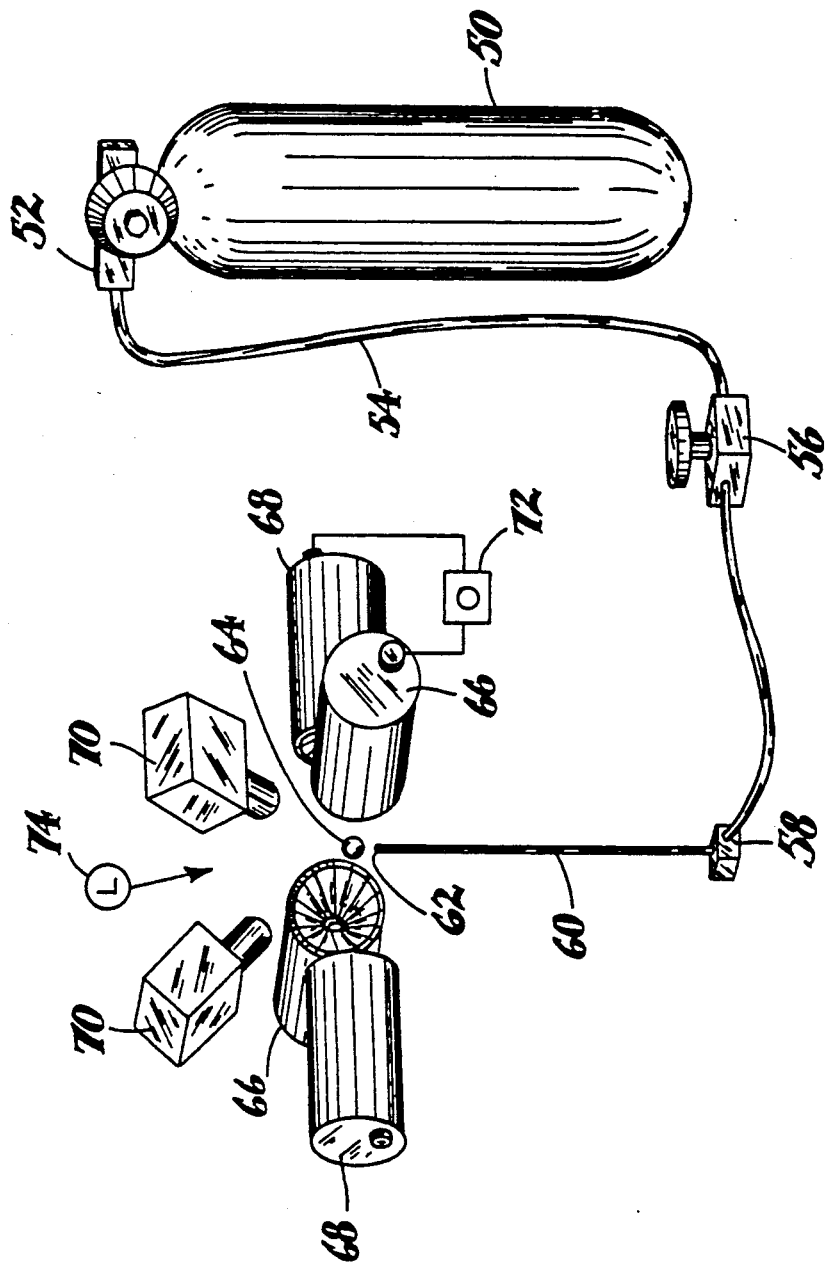
FIG. 2 is a schematic view of one version of the levitator of the present invention.

FIG. 2 illustrates the combination of a gas jet levitator with the type of acoustic levitation device shown in FIG. 1. A source of pressurized gas, such as a pressure tank 50 having a pressure regulator 52 is connected to an outlet line 54 having a needle valve 56. A controlled volume of gas is passed through an appropriately sized orifice, which is in turn connected to an upright delivery tube 60 having an outlet 62. The main purpose of the orifice is to provide a means of flow measurement by monitoring the pressure drop across an orifice of known diameter. For more precise control of the gas flow, a dynamic flow control device can be employed.

The gas exits from the outlet 62 of the tube, which is directed toward a levitation zone in which an object 64 is to be suspended or levitated. Generally, it is preferable to direct the gas flow along a vertical axis, although it is possible to levitate objects by one or more gas streams or jets which are disposed at an angle to the vertical axis. The velocity of the gas stream may be adjusted to attain the desired degree of lift.

Either a laminar or jet gas flow may be employed. In the case of laminar flow, the outlet 62 has a diameter larger than the diameter of the object, and the flow provides an upward lift component with little or no sideways restraining force. In the case of the jet, a nozzle is employed in a known fashion, with the nozzle having a diameter less than the levitated object. Jet flow provides an upward lift component as well as providing some degree of lateral stability due to the flow of gas around the object. Since lateral stability can and is provided by the acoustic levitator, the use of a gas jet is not required but may be useful in some applications. In either type, a vertical upward axial force results from the decrease in momentum of the gas as it passes over the object. The flow rate of the gas may be adjusted to control the distance or position of the object relative to the outlet or nozzle.

In order to maintain the object in a stable horizontal plane, i.e., at right angles to the axis of the gas levitator, an acoustic levitator is employed. As shown in FIG. 2 two pairs of opposed sound sources 66 and 68 are directed toward the levitation zone or the suspended object. As shown, the sound sources are arranged at right angles to each other and are equally spaced apart, with their axes of radiation being in a common plane, which in the example shown, is horizontal. This provides strong lateral positioning forces. Video scanners or other sensors such as 70, may be directed toward the object to monitor the specimen and enable a variety of control or measurement functions. These include position, spin, temperature, movement, phase change, shape or other properties. In addition, as described in the above-referenced application, a phase-shift control 72 may be inserted between the sets of opposed sources and adjusted to impart a torque on the object to minimize or control spinning of the object, or to produce spin if desired. The acoustic field provided exerts a substantially uniform retaining force on the object, providing for a more uniform and stable shape in the event that the object is a liquid. In addition, a heat source, such as a laser 74 having a beam directed at the object, or other known type of electrical or radiant heater may be employed to heat and/or melt the object.

Figure 3:
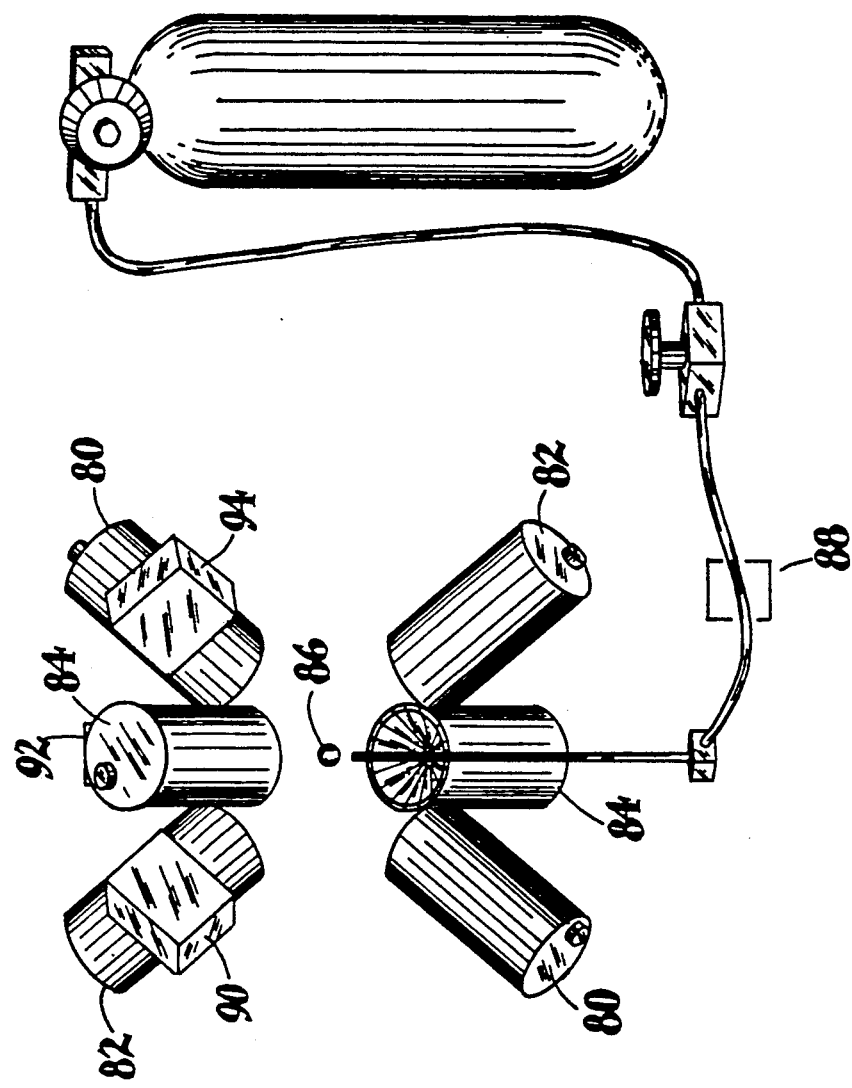
FIG. 3 is a schematic view of another version of the levitator of the present invention.

FIG. 3 shows the combination of a gas levitator in combination with a three axis opposed sound source acoustic levitator. In this embodiment, the opposed pairs of sound sources are illustrated at which 80, 82 and 84, which are arranged along the orthoginal axes with the specimen 86 at the center. This arrangement provides a more uniform distribution of acoustic forces around the object 86 and also, in the arrangement shown, provide some degree of lift and restraint relative to the vertical axis. The majority of the weight of the object, however, is carried by the gas flow.

Also illustrated in FIG. 3 is the possibility of heating the gas prior to delivery to the object 86 by means of a heater 88 associated with the gas supply line. It has been found that preheating of the gas improves the efficiency and stability of the gas levitator. Generally, any temperature above ambient has been found to be helpful, and temperatures in excess of 100 to 150 and up to 600 degrees C. and higher have been shown to be beneficial.

From the embodiments described herein, a number of advantages will be evident. By using air flow to provide upward lift, the degree of acoustic force, energy and sound pressure to hold the object in a given position is minimized, and the problems of generating and dealing with sound at very high pressure levels is considerably reduced. It is possible to stably levitate medium to high density objects in the earth's gravity without the problems and limitations associated with single prior methods and also to provide stable gas levitation of liquids, which has been difficult or impossible to achieve in the past.

The use of the particular acoustic levitator as described herein is highly beneficial because the technique is relatively insensitive to temperature gradients, and a great deal of control over specimen motion and position is available. It will be appreciated, however, that other known types of acoustic levitators may be employed, including tuned cavities or other techniques employing standing waves or one or more reflective surfaces for a sound source.

While the gas flow will ordinarily be used to provide some degree of lift to a levitated object, the use of the steady gas flow around the object during heating and cooling is separately beneficial. When the specimen is heated by a light beam or otherwise, the gas in the vicinity of the specimen is also heated, and the distribution of the hot gas may be irregular or uneven. Since the wavelength of sound varies substantially with temperature, stable positioning is difficult to attain, especially at higher temperatures. The use of a positive gas flow around the object serves to create a more uniform temperature environment around the specimen. The flow of gas sweeps away hot gas around the object and causes the zone of heated gas to be constrained closely adjacent the surface of the object in a uniform manner. The extreme heat is substantially confined or limited to the object itself, and the object is typically small enough, usually less than one-quarter of the wavelength of the sound being employed, so as not to strongly affect the acoustic field.

Figure 4:
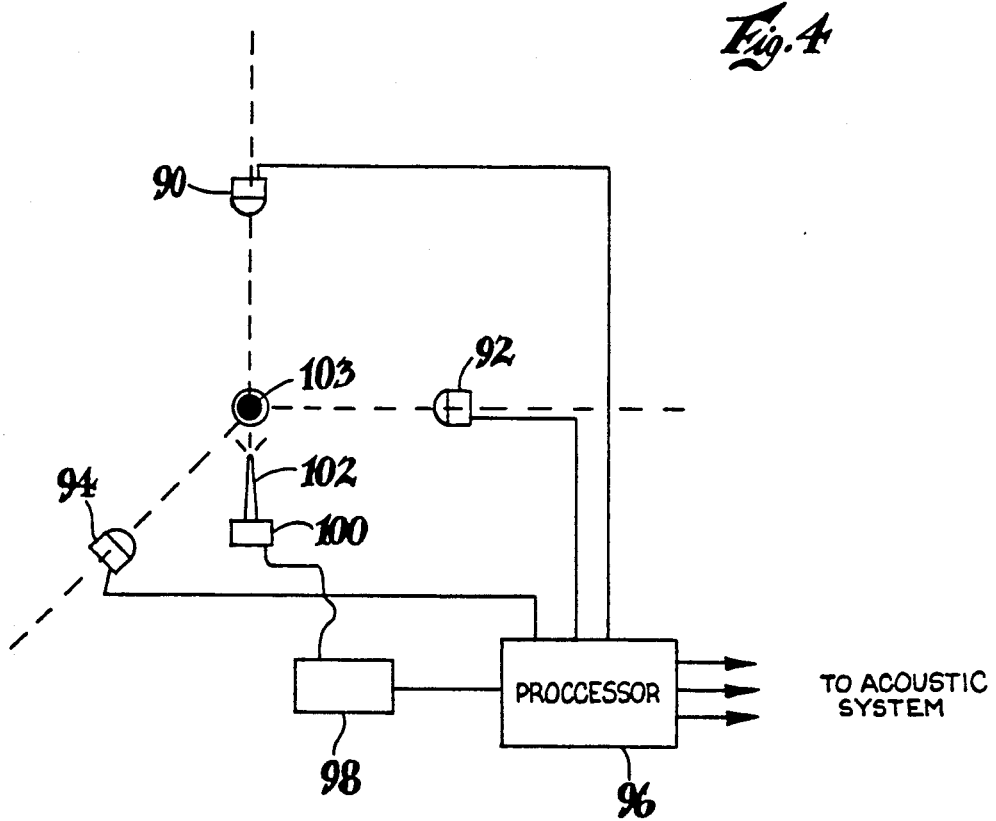
FIG. 4 is a schematic view of a control system which may be employed with the present invention.

FIG. 4 schematically illustrates a control system which may be employed with the apparatus shown in FIG. 3. Position sensors 90, 92 and 94 may be provided along three orthoginal axes corresponding to the three axes of acoustic levitation as shown in FIG. 3. These sensors may also be employed to determine changes of shape of the object, which may occur when the object is melted.

The sensors 90, 92 and 94 are connected to a processor 96 for determining motion of the object. A separate control 98 may be connected to an electrical dynamic valve 100 to regulate the gas flow rate through the nozzle 102, with control 98 being connected to and providing information to the gas flow rate control 98. The controls are employed to maintain the desired position and shape of the object 103.

Information received from the sensors may be employed in a variety of ways. Slow drift of the object relative to an axis can be corrected by sensing the position of the object relative to the desired position, and then adjusting the relative phase or amplitude of appropriate sound sources to return the object to the desired position and/or by adjusting the flow rate of the gas.

If a levitated object is melted, the object tends to assume a flat shape. The flattened melted object would receive an increased upward lifting force from the gas flow, which would result in a rise in specimen position. When such an event is detected, the intensity of the sound sources could be increased to provide increased constraint. In addition, the gas flow rate can be dynamically reduced to compensate for the altered specimen shape, thereby maintaining the object in the desired position.

Finally, rapid movements or oscillations can be detected by the sensors and can be processed to derive a feedback signal proportional to the velocity of the moving specimen. This signal can be used to control the relative phase and/or amplitude of the sound from the opposed sources to counter or dampen such motion. In such event, the energy well for the specimen would be moving in a direction opposite the specimen motion in order to provide a viscous drag force on the object. Very effective motion damping can be achieved using this technique.

The apparatus of the present invention has been successfully employed in the containerless processing of dense materials at earth gravity and high temperatures. For example, in preliminary testing of the device, specimens of Aluminum Oxide ($Al_2O_3$) have been stably levitated, heated and melted up to a temperatures up to 2400° C., or about 350° above the melting point. Also, liquid Aluminum Oxide has been undercooled down to about 1725° C. or about 325° C. below the melting point before recolescence and solidification occurred. The previously unobtainable results are indicative of the capabilities of this technique. Using this technique, earth based containerless processing of a variety of materials, including conductive and non-conductive liquids, is now possible.

We claim:

1. A levitation device for suspending a specimen object under the influence of gravity without contact with a solid surface comprising in combination gas levitation means for directing a concentrated flow of gas along an axis upwardly against the object to provide a force to lift a majority of the wight of the object, and acoustic levitation means for exerting an acoustic positioning force on said object to restrain movement away from said axis and to hold said object in a given position.

2. The device of claim 1, wherein said acoustic levitation means comprises a plurality of interfering sound sources directed at said object on an angle relative to said axis.

3. The device of claim 2, comprising a pair of opposed sound sources operating at the same frequency.

4. The device of claim 2, wherein the sound sources have axes of radiation in a common plane.

5. The device of claim 2, wherein the sound sources have axes of radiation in a plurality of planes.

6. The device of claim 2, comprising three sets of opposed sound sources, each having a separate common axis of radiation, with the axes of the three sets being arranged orthoginally.

7. The device of claim 1, further comprising means for heating the gas before contact with the object.

8. The device of claim 1, additionally comprising detector means for detecting the position of the object.

9. The device of claim 1, wherein the acoustic levitation means comprises means for applying a torque to the object.

10. The device of claim 1 wherein the acoustic levitation means comprises means for changing the position of the object.

11. The device of claim 1 additionally comprising means for heating the object.

12. A method of levitation of a specimen under the influence of gravity comprising the steps of applying an upward stream of gas on said object sufficient to provide lifting forces for said object, and applying acoustic forces on said object to restrain sideways movement of the object and to hold said object in a given position.

13. The method of claim 12 wherein said object is heated and melted.

14. The method of claim 13 comprising the additional step of changing the rate of flow of gas on said object as it becomes melted and liquid.

15. In a levitation apparatus wherein an object is suspended without contact with a container, the improvement comprising, in combination, means for applying acoustic positioning forces on said object, means for heating the object, and means for providing a flow of gas around the object to remove heated gas near the surface of the object.

* * * * *